(12) United States Patent
Sheth et al.

(10) Patent No.: US 12,136,086 B2
(45) Date of Patent: Nov. 5, 2024

(54) CROSS-BORDER QUICK RESPONSE (QR) PAYMENT FLOW FOR ENCRYPTED PRIMARY ACCOUNT NUMBER (PAN) PAYMENT FLOW

(71) Applicant: VISA INTERNATIONAL SERVICE ASSOCIATION, San Francsico, CA (US)

(72) Inventors: Pranav Sheth, San Francisco, CA (US); Ying Hao, Austin, TX (US); Vinay Gaonkar, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 472 days.

(21) Appl. No.: 17/439,304

(22) PCT Filed: Jun. 18, 2019

(86) PCT No.: PCT/US2019/037730
§ 371 (c)(1),
(2) Date: Sep. 14, 2021

(87) PCT Pub. No.: WO2020/256705
PCT Pub. Date: Dec. 24, 2020

(65) Prior Publication Data
US 2022/0156731 A1    May 19, 2022

(51) Int. Cl.
*G06Q 20/38*    (2012.01)
*G06Q 20/20*    (2012.01)
(Continued)

(52) U.S. Cl.
CPC ......... *G06Q 20/3823* (2013.01); *G06Q 20/20* (2013.01); *G06Q 20/3276* (2013.01);
(Continued)

(58) Field of Classification Search
None
See application file for complete search history.

(56) References Cited

U.S. PATENT DOCUMENTS 6,834,271 B1 * 12/2004 Hodgson ................ G06Q 20/04
705/72
7,909,243 B2 * 3/2011 Merkow ............ G06Q 20/3255
705/41
(Continued)

FOREIGN PATENT DOCUMENTS

| CA | 2893709 A1 * | 6/2014 | ............ G06Q 20/18 |
| EP | 3686761 A1 * | 7/2020 | ............ G06F 21/30 |

(Continued)

OTHER PUBLICATIONS

Zoran Djuric, "IPS—secure Internet payment system," International Conference on Information Technology: Coding and Computing (ITCC'05)—vol. II, Las Vegas, NV, USA, 2005, pp. 425-430 vol. 1, doi: 10.1109/ITCC.2005.181. (Year: 2005).*

(Continued)

*Primary Examiner* — Patrick McAtee
*Assistant Examiner* — Eduardo Castilho
(74) *Attorney, Agent, or Firm* — K&L Gates LLP

(57) ABSTRACT

A computer-implemented system for streamlining encryption payload of a card transaction from a transaction code transaction via a merchant inside a restricted computer network firewall. A wallet application stores data of a payment device, and the wallet application retrieves information of a merchant and a transaction via a transaction code. In response to the retrieved information, the wallet application generates an encrypted payload. The wallet application transmits the encrypted payload to a payment facilitator within the restricted computer network firewall. After decryption of the encrypted payload, the payment facilitator transmits a decrypted payload in one payment (Continued)

packet to the payment processing server outside the restricted computer network firewall. The payment processing server transmits from outside the restricted computer network firewall to the merchant inside the restricted computer network firewall a notification of payment after the payment processing server validates the payment transaction.

17 Claims, 6 Drawing Sheets

(51) Int. Cl.
  *G06Q 20/32* (2012.01)
  *G06Q 20/36* (2012.01)
  *H04L 9/40* (2022.01)
(52) U.S. Cl.
  CPC ... *G06Q 20/3674* (2013.01); *G06Q 20/38215* (2013.01); *H04L 63/0236* (2013.01); *G06Q 2220/00* (2013.01)

(56) References Cited

U.S. PATENT DOCUMENTS

| | | | | |
|---|---|---|---|---|
| 8,254,572 | B2* | 8/2012 | Vaughan | H04L 9/0827 380/44 |
| 8,301,500 | B2* | 10/2012 | Pharris | G06Q 20/385 705/17 |
| 9,613,352 | B1* | 4/2017 | Leoutsarakos | G06Q 20/4014 |
| 9,639,714 | B1* | 5/2017 | Carlson | G06F 21/6218 |
| 10,445,629 | B2* | 10/2019 | Singh | G06Q 20/3276 |
| 2007/0027816 | A1 | 2/2007 | Writer | |
| 2012/0150750 | A1* | 6/2012 | Law | G06Q 20/40 705/76 |
| 2013/0212666 | A1* | 8/2013 | Mattsson | G06Q 20/385 726/9 |
| 2013/0332343 | A1 | 12/2013 | Desai | |
| 2014/0067566 | A1* | 3/2014 | Leyva | G06Q 20/20 705/18 |
| 2014/0317312 | A1* | 10/2014 | Mitchell | H04L 12/4633 709/244 |
| 2015/0046338 | A1 | 2/2015 | Laxminarayanan | |
| 2015/0052036 | A1 | 2/2015 | Vernal | |
| 2015/0088674 | A1* | 3/2015 | Flurscheim | G06Q 20/326 705/17 |
| 2015/0178862 | A1* | 6/2015 | Angrish | G06Q 10/02 705/5 |
| 2015/0269559 | A1* | 9/2015 | Inotay | G06Q 20/02 705/44 |
| 2015/0271150 | A1* | 9/2015 | Barnett | G06Q 20/401 713/171 |
| 2016/0239824 | A1* | 8/2016 | Klingen | G06Q 20/3821 |
| 2016/0277363 | A1* | 9/2016 | Kaladgi | H04L 63/0428 |
| 2017/0221054 | A1* | 8/2017 | Flurscheim | G06Q 20/3276 |
| 2017/0337550 | A1* | 11/2017 | Aparicio Ruiz | G06Q 20/3829 |
| 2018/0315045 | A1* | 11/2018 | Leyva | G06Q 20/388 |
| 2019/0087815 | A1* | 3/2019 | Goldschmidt | G06Q 20/3674 |

FOREIGN PATENT DOCUMENTS

| | | | | |
|---|---|---|---|---|
| WO | WO-2012111019 A1 * | 8/2012 | | G06Q 20/12 |
| WO | WO-2016059486 A1 * | 4/2016 | | |
| WO | 2020256705 | 12/2020 | | |

OTHER PUBLICATIONS

A. Abdel-Hamid, O. Badawy and S. Bahaa, "PA-SET: Privacy-aware SET protocol," 2012 22nd International Conference on Computer Theory and Applications (ICCTA), Alexandria, Egypt, 2012, pp. 15-22, doi: 10.1109/ICCTA.2012.6523541. (Year: 2012).*
J. Téllez Isaac and Z. Sherali, "Secure Mobile Payment Systems," in IT Professional, vol. 16, No. 3, pp. 36-43, May-Jun. 2014, 2014, doi: 10.1109/MITP.2014.40. (Year: 2014).*
J. Santos, M. Antunes, J. Mangana, D. Monteiro, P. Santos and J. Casal, "Security testing framework for a novel mobile wallet ecosystem," 2017 9th International Conference on Computational Intelligence and Communication Networks (CICN), Girne, Northern Cyprus,pp. 153-160, doi:10.1109/CICN.2017.8319376 (Year: 2017).*
Jin Tang and J. A. Copeland, "Mobile IPv4 secure firewall traversal with deployment of foreign agents," IEEE Wireless Communications and Networking Conference, 2005, New Orleans, LA, USA, 2005, pp. 1533-1538 vol. 3, doi: 10.1109/WCNC.2005.1424742. (Year: 2005).*
J Christopher Westland; Theordore H. Clark, "Secure Digital Payments," in Global Electronic Commerce: Theory and Case Studies, MIT Press, 1999, pp. 465-528. (Year: 1999).*
Extended European Search Report issued in App. No. EP19934224, dated Jan. 9, 2023, 10 pages.
Xu Xueyang et al: "Internet Censorship in China: Where Does the Filtering Occur?", Mar. 20, 2011 (Mar. 20, 2011), SAT 2015 18th International Conference, Austin, TX, USA, Sep. 24-27, 2015; [Lecture Notes in Computer Science; Lect.Note5 Computer], Springer, Berlin, Heidelberg, pp. 133-142, XP047371651, ISBN: 978-3-540-74549-5.
International Searching Authority, "Written Opinion," issued in connection with International Patent Application No. PCT/US19/37730, mailed Sep. 10, 2019, 10 pages.
International Searching Authority, "Search Report," issued in connection with International Patent Application No. PCT/US19/37730, mailed Sep. 10, 2019, 10 pages.

* cited by examiner

CROSS-BORDER QUICK RESPONSE (QR) PAYMENT FLOW FOR ENCRYPTED PRIMARY ACCOUNT NUMBER (PAN) PAYMENT FLOW

CROSS-REFERENCE TO RELATED APPLICATION

This application is a national phase application of PCT International application number PCT/US2019/037730, filed Jun. 18, 2019, which is incorporated by reference in its entirety herein.

TECHNICAL FIELD

Embodiments discussed herein generally relate to transforming quick response (QR) payment flow to encrypted primary account number (PAN) payment flow inside and outside a restricted computer network firewall.

BACKGROUND

Usages of cashless payment devices such as credit cards are no longer confined to a regional or restricted geographic regions. From promotions from card issuers who waive international transaction fees to wider acceptances of these devices by merchants even with transactional fees, consumers are able to conveniently use the devices without thinking too much about the acceptance thereof.

However, due to national policies, some countries impose restrictive computer network firewall to restrict network data flows to and from the country. For example, People's Republic of China has established a restrictive computer network firewall that may restrict general network data packet flows. Unless receiving exceptions or exemptions from the national government, this restriction may cause data access issues for travelers.

This restriction, unfortunately, may have caused minimal card acceptance points in China thus making payments with a plastic almost impossible for cashless cardholders when traveling.

Therefore, embodiments attempt to solve or address one or more of the problems identified.

SUMMARY

Aspects of the invention overcome the deficiencies of existing configuration by creating a combination of cross-border digital wallet application and a transformation of transaction code based transactions (e.g., quick response (QR) code based transactions) to encrypted primary account number (PAN) based payment flow. In one embodiment, the cross-border wallet application enables a consumer or cardholder who are traveling into countries where there is a restricted computer network firewall, such as P.R. China, to be able to use his or her credit card (such as VISA credit card) in the form factor commonly accepted in the country.

In another embodiment, merchants who accept QR-code payments from mobile devices through both consumer presented QR code or Merchant presented QR code may be receive payments from the cross-border digital wallet application ("wallet app"). In one embodiment, the merchants may display many QR codes that work for existing consumers and/or a consolidated single QR-Code according to aspects of the invention. This consolidated single QR code may be displayed and scanned by any of the participating wallet apps.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
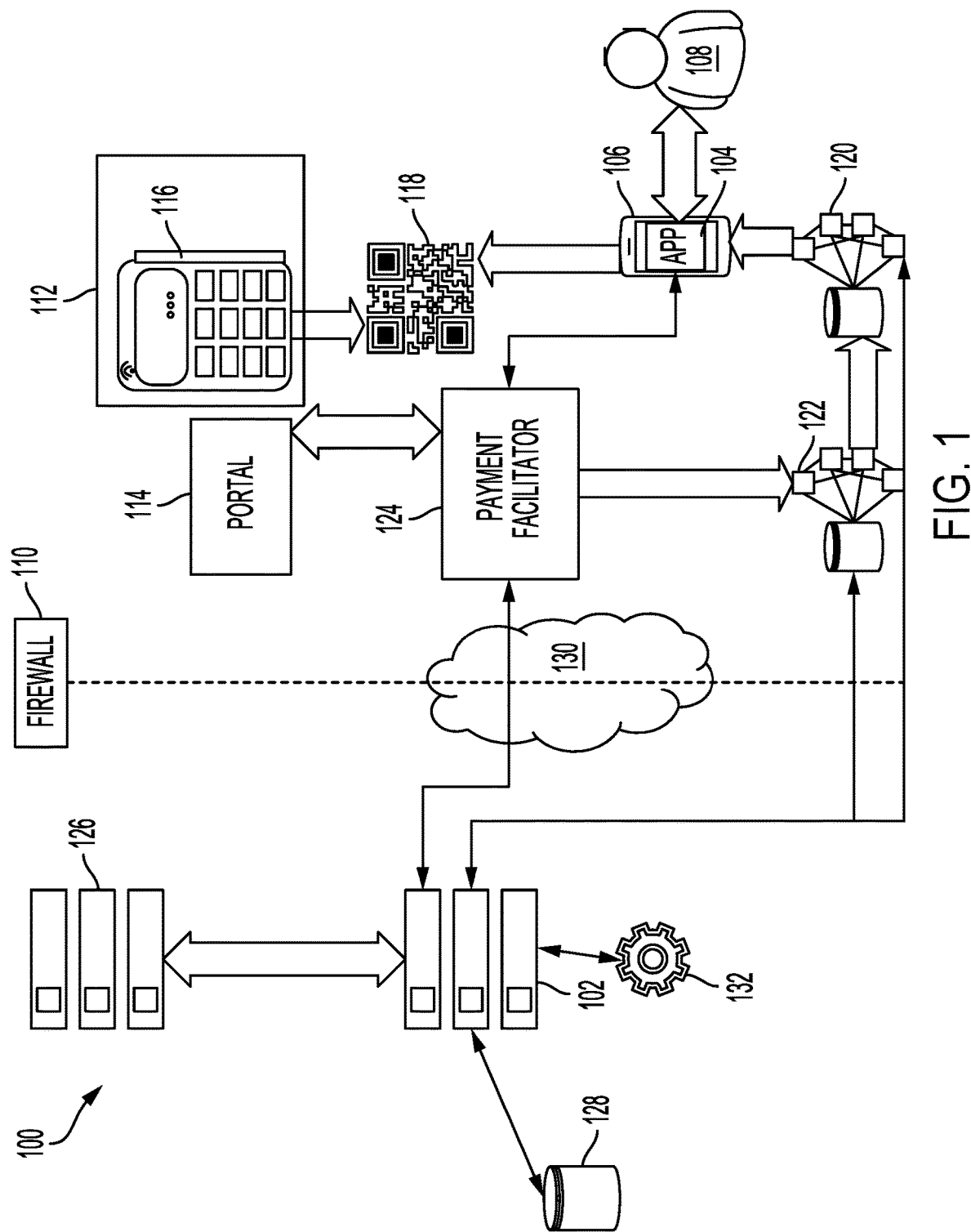
FIG. 1 is a diagram illustrating a system for facilitating a wallet app consumer for conducting cross-border transactions with merchants within a restricted computer network firewall according to one embodiment.

Referring now to FIG. 1, a diagram illustrates a system 100 for facilitating a wallet app consumer for conducting cross-border transactions with merchants within a restricted computer network firewall according to one embodiment. In one embodiment, the system 100 may include a payment processor server 102 that is configured to execute computer-executable instructions for processing cashless payment transactions. For example, the cashless payment devices such as credit cards, debit cards, gift cards, prepaid cards, etc., may be cashless payment devices. In another embodiment, the server 102 may interface with user portals such as via webpages or other user interfaces. In another example, the server 102 may provide a mobile application such as a wallet application ("wallet app") 104 to be installed on a mobile device 106 to interact with services provided by the server 102. For example, the wallet app 104 enables a consumer 108 to set up an account to store data or link data to one or more cashless payment devices therein. This wallet app 104 may enable the consumer 108 to use one or more hardware elements or components of the mobile device 106 (for more example and discussion, see FIG. 5) for engaging a merchant for transactions.

In one example, the consumer 108 may travel abroad and may wish to make purchases using one of the cashless payment devices. In a similar situation, suppose the consumer 108 is traveling to locations to where there is a restricted computer network firewall 110 that is imposed based on a national policy, laws, or rules. For example, the restricted computer network firewall 110 restricts computer network traffic or data packets to servers located outside the firewall 110. As such, traffic from inside the firewall 110 would not or would be delayed in sending data to servers outside the firewall 110.

In another embodiment, aspects of the invention do not attempt to violate national rules or laws. Instead, aspects of the invention aim to conform to national rules or laws by transforming payment flows to be transmitted at a fast rate than existing approach.

Back to the example when the consumer 108 travels abroad, the consumer 108 may wish to conduct a purchase or transaction with a merchant 112 who may operate a portal or web page 114 and include a point of sale (POS) 116 using the wallet app 104 because the wallet app 104 includes one more accounts for the cashless payment devices. In one example, the POS 116 of the merchant 112 may have one or more options to complete the transaction: cash in local currency, swipe a physical cashless payment device, or scan a transaction code 118.

In one embodiment, the consumer 108 may opt for scanning the transaction code 118 using a camera associated with the mobile device 106 so that the scanned information from the transaction code 118 may be accepted by the wallet app 104. In one embodiment, the transaction code 118 may be a quick response (QR) code, a bar code, or other code (whether two-dimensional or three-dimensional) that embeds information for the transaction.

In another embodiment, the wallet app 104 may include an interface (e.g., graphical user interface) for the consumer 108 to use to operate the camera to capture the code. It is to be understood that other approaches may be available for the consumer 108 to use the mobile device 106 or the wallet app 104 to obtain the embedded information in the transaction code 118.

In one example, instead of using a closed-loop payment flow in the embedded information for the transaction code 118, the transaction code 118 of aspects of the invention may embed information in a form of a universal resource location (URL) and redirect to a HTML page to complete the payment. In another embodiment, the transaction code 118 may not be a EMVCo standard QR-code.

In one embodiment, the wallet app 104 may be initiated by a consumer wallet service (CWS) 120 and a wallet payment service (WPS) 122 before receiving the embedded information from the merchant 112 via the transaction code 118 to communicate with a payment facilitator 124. In another embodiment, the CWS 120 may be treated as a backend server for the wallet app 104, and that the CWS 120 may then call or place a request data packet to the WPS 122. In one embodiment, one or more payment facilitators may enroll and register with the server or payment processor 102 and may call or place a request to the WPS 122 (as illustrated below). In a further embodiment, the payment facilitator 124 may also be treated as a server for a third party wallet app in lieu of the wallet app 104, if permitted, for the consumer 102 to conduct transactions with the merchant 112. The server or payment processor 102 may issue an outbound encryption key to the payment facilitator 124 link to an identification (ID) of the payment facilitator 124.

Figure 2:
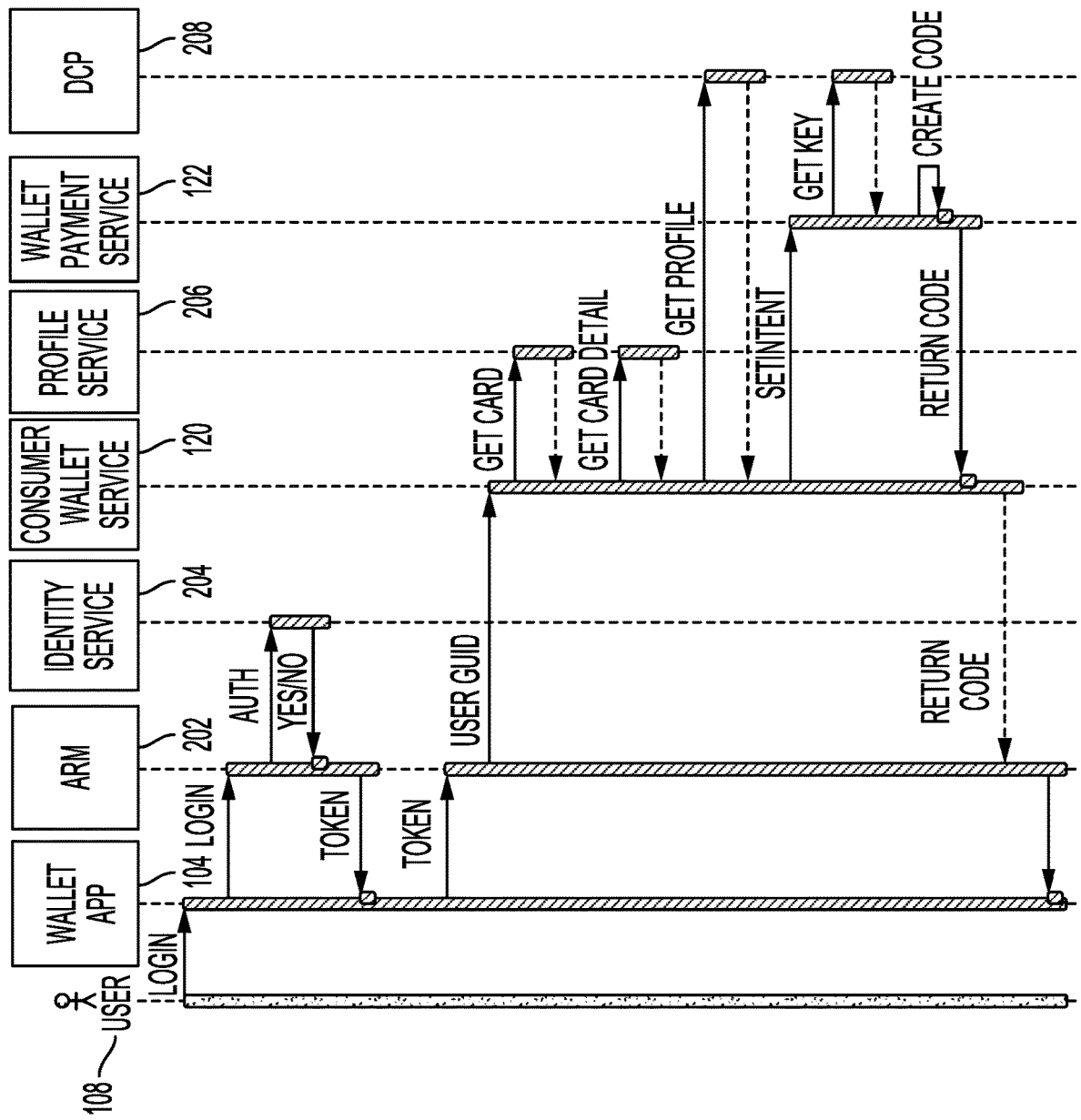
FIG. 2 is a flow diagram illustrating a wallet service for the wallet app according to one embodiment.

Referring now to FIG. 2, a flow diagram illustrates a wallet service for the wallet app according to one embodiment. In one embodiment, the flow diagram may illustrate a flow for the consumer 108 to operate the wallet app 104. For example, when the consumer 108 may first login to the wallet app 104. The login request, for example, may be sent to an authentication and resource manager (ARM) 202, and entry of the consumer 108 may be forwarded to an identity service 204. For example, the ARM 202 may be configured to execute computer-executable instructions for passing user name and password to the identity service 204, which may validate the user name and password. In one example, the identity service 204 may include a server (such as the one described in FIG. 6) or a cluster of servers that may receive entries or input from the user such as username and password. If those two items are valid, the identity service 204 may pass back two items back to the ARM 202: an indication that the login was successful, and a user global user ID (GUID). In one example, the ARM 202 may save the GUID and store it locally, and generate and pass to the wallet app 104 a token. This token may be used on all subsequent requests.

In another embodiment, on subsequent requests, the wallet app 104 may send in the token to the ARM 202. The ARM 202 may validate the token, and then put the GUID in a header of a data packet to a consumer wallet service (CWS) 120 so that the CWS 120 may identify which user is requesting a particular action.

In another embodiment, the CWS 120 may receive instructions from the consumer 108 or may infer the instructions from the consumer 108 due to default settings to retrieve or get a profile of the consumer 108. For example, the "get profile" function is called, a device identification (ID) for the mobile device 106, for example, may be pushed to the mobile device 106. For example, information such as addresses, names, basic information of one or more cashless payment devices of the consumer 108 may be passed. In one example, non-sensitive information about each of the enrolled cards may be forwarded. In another example, transaction history data may be returned if the profile includes such information. For example, a request to a digital commerce platform (DCP) 208 may retrieve the transaction history for each card or payment device. For example, the CWS 120 may receive such data and the DCP 208 that has stored information. In another embodiment, the DCP 208 may be supported by a hardware security manager (HSM) (not shown) to store information that meet necessary guidelines, such as geographic information system (GIS) guidelines, for safeguarding such information. As such, the non-sensitive information about a card of the consumer 108 (e.g., last four, card art, etc.) may be retrieved. In another embodiment, information about the default card of the consumer 108 may also be retrieved.

As discussed above, the consumer 108 may wish to conduct a transaction with the merchant 112. As such, the consumer 108 may conduct actions such as scanning the code 118 to manifest such intent. Referring back to FIG. 2, the CWS 120 may send information embedded in the code 118 to the WPS 122.

As to be discussed below, instead of forwarding the code 118 or other purchase information unaltered or unmodified to an acquirer directly, due to the challenges with the restricted computer network firewall 110, aspects of the invention modify the data packet to be streamlined so that the consumer 108 may not realize the difference in how the server 102 handles the transaction. With such implementation, a "set intent" call sending information from the code 118 and an intent ID to a digital commerce platform (DCP) 208.

In one example, the CWS 120 may retrieve from the DCP 208 the full primary account number (PAN) and the expiration date for the payment device (e.g., default card). Along with, the token, the embedded information from the code 118, and the intent ID, the DCP 208 may retrieve a client ID of the payment facilitator 124 to the WPS 122.

In another embodiment, the WPS 122 may create a data packet with an intent after storing the payment information. In one aspect, the WPS 122 may create the code (see FIG. 4 below), such as a QR code or a barcode, pointing to the intent data packet. In another embodiment, the WPS 122 may use the client ID to look up the encryption keys for each the payment facilitator 124.

In a further embodiment, the WPS 122 may encrypt the intent data packet payload, once for each client. The WPS 122 may then return the code 118, the intent ID, and the token back to the CWS 120. The CWS 120 may store the intent ID, the user GUID, and the device ID in a table. In such an embodiment, when the WPS 122 later passes back the transaction for a particular intent, the CWS 120 may know which device, such as the mobile device 106, to notify.

In one embodiment, the CWS 120 may store transaction history (a subset of the information stored in the WPS 122) and such transaction history may be retrieved by the wallet app 104 just after login so that the history may be shown on a GUI (such as a first page) of the wallet app 104.

It is also understood that the wallet app 104 or the CWS 120 may interact with the operating system of the mobile device 106 to issue additional notifications to the mobile device 106 as permitted by the operating system of the mobile device 106.

Figure 3:
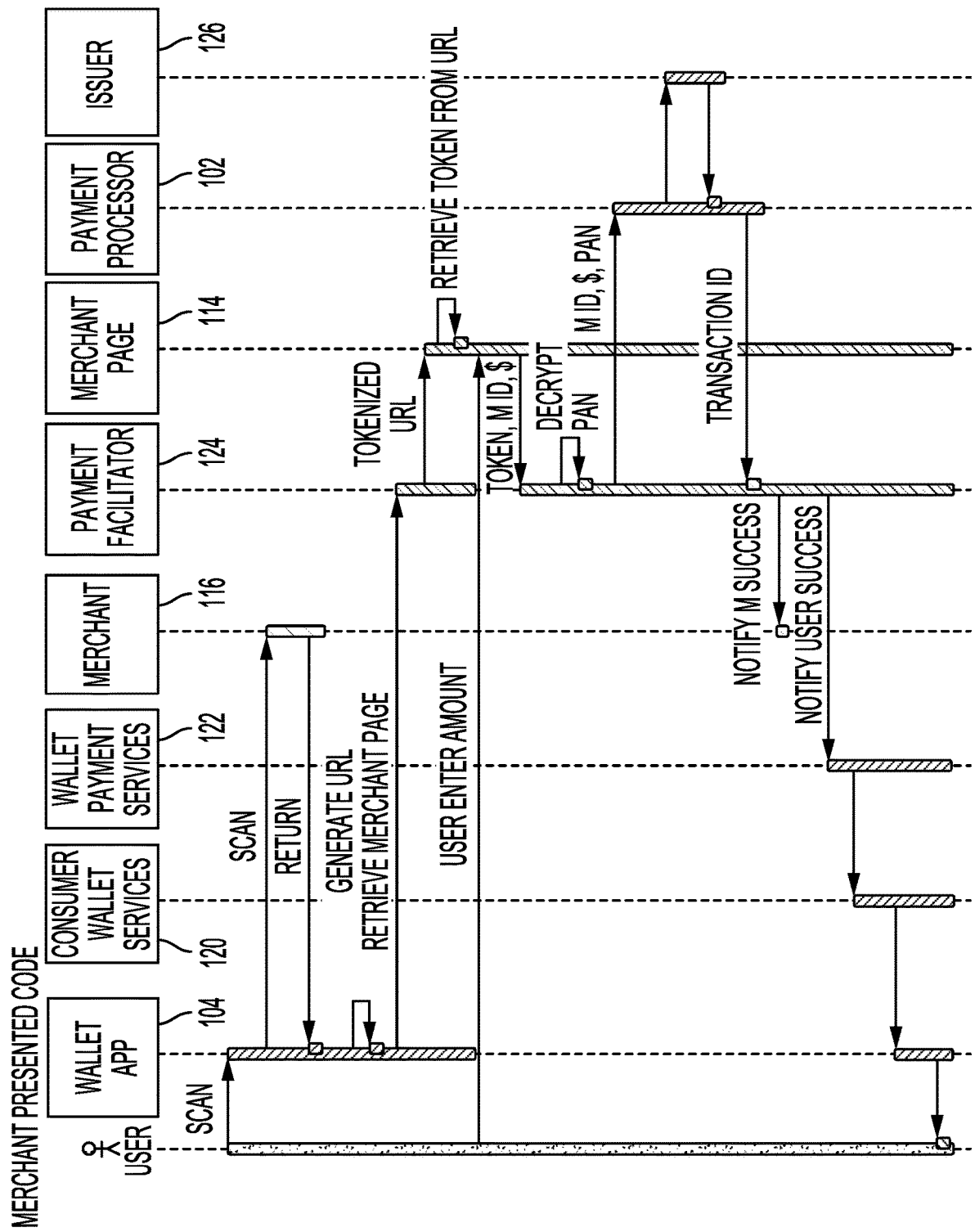
FIG. 3 is a diagram illustrating processing of merchant presented code transaction inside a restricted computer network firewall via a wallet app installed on a mobile device according to one embodiment.

Referring to FIG. 3 while referencing FIG. 1, a flow diagram further illustrates embodiments of the invention with the payment facilitator 124 when the merchant 112 presents the code 118.

For example, as discussed, as an approach to facilitate transactions for the consumer 108 who travels abroad to a location within the restricted computer network firewall 110, aspects of the invention create the wallet app 104 to work with the payment facilitator 124. For example, the wallet app 104 may collaborate with the payment facilitator 124 who may be a local payment aggregator to utilize its unified acceptance points. As such, the consumer 18 may be able to scan the transaction code 118, either as a merchant QR-Code (e.g., mQR), a consumer-side QR-Code (e.g., cQR), or Barcode (e.g., cBR) on the mobile device 106 to pay with the underlying transaction with one or more payment devices already associated with the wallet app 104 instead of cash in local currency.

In a further embodiment, aspects of the invention may enable the wallet app 104 to be universally available across borders. For example, the restricted computer network firewall 110 may not be a national computer network firewall but an institutional or company-wide. For example, an online merchant or marketplace in a given country may require the cashless payment device be issued by an issuer of a certain country. As the consumer 108 travels to such country, the cards in the consumer's profile may not be issued by an issuer of the destination country. As such, the payment processor may trigger to implement aspects of the invention to identify the payment facilitator that facilitate the transaction for the consumer 108 with the online merchant.

Continue to refer to FIG. 3, the flow diagram illustrates a use case where the merchant 112 presents the code 118 for the consumer 108 to use the mobile device 106 to capture the contents of the code 118. As discussed, the wallet app 104 may receive the embedded information from the code 118, which in one example, may be the URL linking the portal or merchant page 114.

In one embodiment, the URL may be used to fetch a page from the payment facilitator 124 and the wallet app 104 may display the page in the wallet app 104 via the mobile device 106. This page may include the merchant logo, and may allow the consumer 108 to enter the amount of the transaction.

In another embodiment, the page of the payment facilitator 124 may be the portal 114. The consumer 108 may enter the amount of the transaction and select "SUBMIT" on the wallet app 104. The amount and the page may be submitted to the payment facilitator 124. In another embodiment, the payment facilitator 124 may process the page and the content (e.g., the amount and other information such as the merchant ID, etc.,). Since the payment processor 124 has registered with the server or the payment processor 102, the payment facilitator 124 may be configured to execute computer-executable instructions or function calls to the payment processor 102 with the data packet.

In another embodiment, the payment processor 124 may tokenize or encrypt the URL, the amount, merchant information, etc., to the specification specified by the server 102. For example, suppose the server 102 specifies a certain ISO specification for the data packet and the tokenization, the payment facilitator 124 may generate the data packet meeting the specifications.

In another embodiment and also referring to FIG. 2, the DCP 208 may handle the requests for the server 102. For example, as the DCP 208 may provide an ID for the payment facilitator 124, the DCP 208 may handle the requests such as the data packet described above to the server 102.

In another embodiment, the payment facilitator 124 may further include an merchant ID for the merchant to be included in the data packet along with the amount of transaction, and the PAN. In one embodiment, the PAN may be retrieved in response to the consumer's 108 login to the wallet app 104. For example, in response to the login, the wallet app 104 may return a list of cards, a token, a PAN of a default card, and cQR or cBR.

In another embodiment, the token may be time sensitive. For example, the token may expire after a certain period or a "session" may be defined by the period so that the token is useless after the expiration to protect the consumer 108 for unauthorized use.

Once the portal 114 is loaded through the payment facilitator 124, the token is appended to the URL as a fragment to the URL. In one embodiment, when the consumer 108 enters the amount into the portal 114 and hits submit via the wallet app 104, the portal 114 may fetch or retrieve the token from the URL, and then send it to the payment facilitator 124, along with the merchant ID and amount.

In one embodiment, the payment facilitator 124 may decrypt the token and the decrypted data packet may include the PAN that it needs to send into the server or payment processor 102. As one may recall from the above, the tokenization may occur via the ARM 202 in FIG. 2.

Referring back to FIG. 1, the payment facilitator 124 transmits the data packet with the decrypted PAN to the server or payment processor 102 through the restricted computer network firewall 110. As atypical of the common approach, aspects of the invention streamline the data packet to reduce frequency of passing between the merchants and the server 102. The transmission of such data packet according to aspects of the invention reduce the time needed for approval by the server 102 as well as the frequency. As one could appreciate, when traveling abroad, making and completing transactions using payment devices issued by another country could be relatively time-consuming, given the fact that one is used to the fast turnaround time (e.g., within seconds) enjoyed at the home country. As such, with the streamlined approach, aspects of the invention provide technical solutions to the technical problems experienced with the restricted computer network firewall 110 when traveling.

In one embodiment, the server 102 may process the streamlined data packet and send it to the issuer 126 for final processing. Once it is approved, the server 102 may return a response to the payment facilitator 124 with a transaction ID and an acknowledgment whether the transaction is successful. The payment facilitator 124 may call the merchant 112 using its already existing channels between the payment facilitator 124 and the merchant 112, as well as calling any additional API provided to the payment facilitator 124. In one embodiment, the payment facilitator 124 may send the transaction ID and the approval to the WPS 122.

In one embodiment, the DCP 208 may provide a key management to manage a key for the payment facilitator 124. For example, the DCP 208 may provide a GUI may provide configurations to the key, such as a naming convention, key rotation, time limitation, etc., (e.g., a time of overlapping keys). As such, when processing the data packet from the payment facilitator 124, the server 102 (or as delegated to the WPS 122 or the DCP 208) may review a timestamp in a header section of the data packet to determine if the time specified in the header is less than a certain time, such as 60 minutes.

In another embodiment, now referring to FIG. 1, the server 102 may further be coupled to a database storing data for the server 102. In a further embodiment, the database 128 may further include a data store for storing data codes, developer codes, computer-executable instruction kits, API specifications, etc., for the payment facilitator 124 (via the WPS 122). In yet another embodiment, the server 102 may include a configuration portal 132 for administrator access or other configuration or setting controls.

Figure 4:
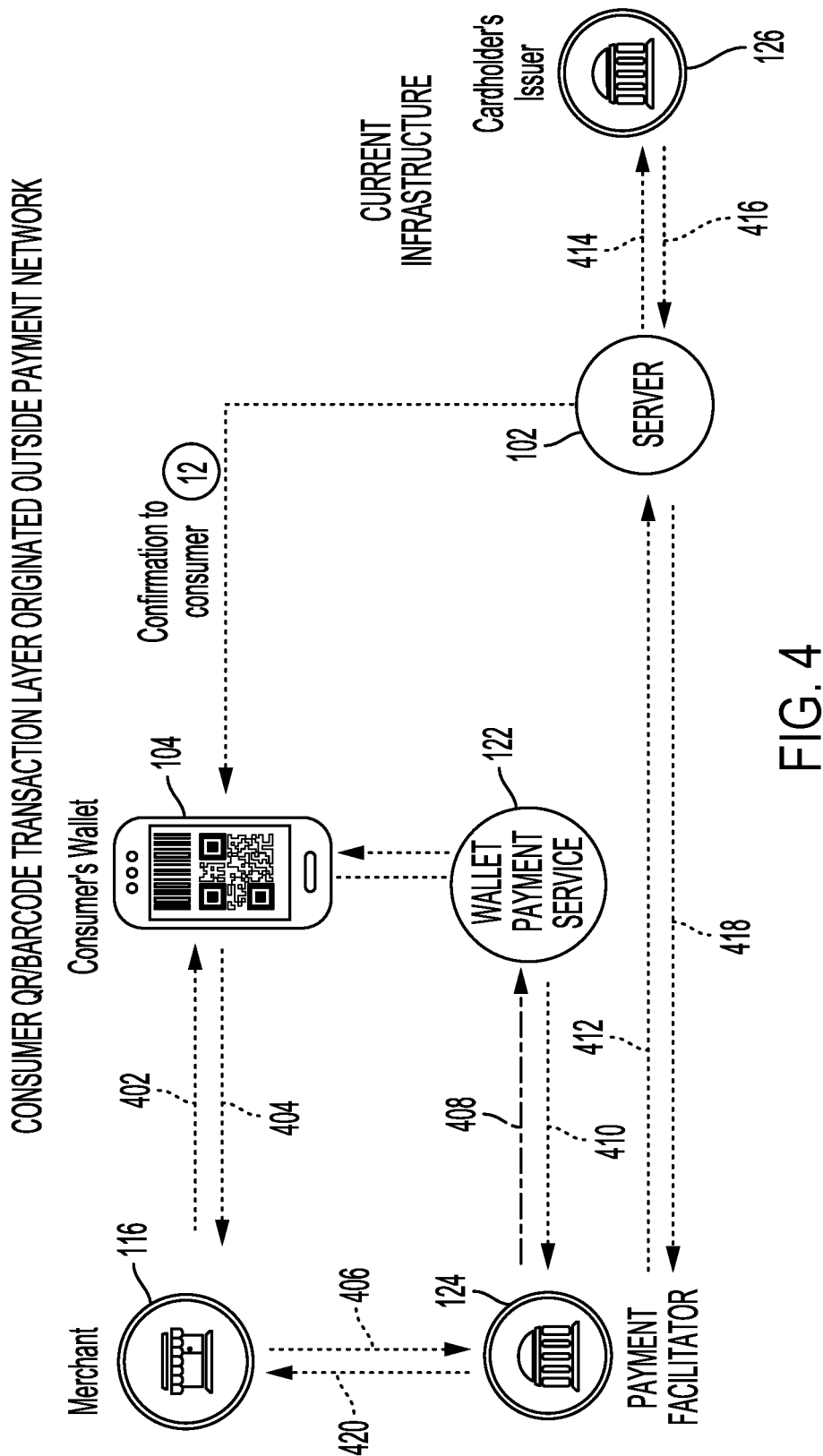
FIG. 4 is a diagram illustrating processing of consumer presented code transaction inside a restricted computer network firewall via a wallet app installed on a mobile device according to one embodiment.

Referring now to FIG. 4, another flow diagram illustrates situations associated with user presented code 118 via the wallet app 104. For example, as discussed above, the transaction may also be initiated via the wallet app 104 of the consumer 108 by presenting the code (e.g., cQR or cBR) to the merchant 112.

For example, as FIG. 2 illustrates and as FIG. 4 shows, the consumer 108 may need first log in to the wallet app 104 via the ARM 202. The wallet app 104 may receive the cQR or the cBR as the code 118 and the code 118 may be tokenized.

In one embodiment, the cQR or the cBR may use a time to live (TTL) configuration so that the wallet app 104 should only show the code 118 if the TTL has not expired.

In another embodiment, the consumer 108 may be directed to a code page to present the code 118. If the TTL timer has expired, the wallet app 104 may fetch a new code. If the TTL timer has not expired, the wallet app 104 may simply display the code 118 along with any other information that discussed above.

In another embodiment and as discussed above, the WPS 122 may generate the intent ID for the consumer 108 to use for conducting the transaction. For example, the CWS 120 may send or pass payment information to the WPS 122. The WPS 122 may then generate the intent ID and the barcode before sending them to the WPS 122. The CWS 120 may further forward or send the barcode to the wallet app 104.

Once the code 118 is presented on the wallet app 104, the merchant 112 may use its POS 116 scans the code 118 at 402. In one embodiment, the wallet app 104 may send a reference number to the merchant 112 at 404. The merchant 112 may next send the reference number to the payment facilitator 124 at 406. The payment facilitator 124 may forward the reference number to the identity service 204 at 408. In one example, as discussed above, the ARM 202 may handle authentication and resource management for the server 102 and may handle the login for the consumer 108. The ARM 102 may further communicate to the identity service 204 which have access to consumer profile, which may include a list of cards that the user may possess.

In one embodiment, the WPS 122 may receive a request from the payment facilitator 124 to request for the PAN. For example, the payment facilitator 124 may exchange a barcode for an encrypted payment instrument, such as an encrypted PAN. As such, the WPS 122 may return with an encrypted PAN to the payment facilitator 124 at 410.

In one embodiment and as discussed above, the payment facilitator 124 may decrypt the encrypted PAN and may send the data packet, as discussed above and over the restricted computer network firewall 110, to the server 102 outside the restricted computer network firewall 110 at 412. Also as discussed and, according one embodiment, the server 102 may forward the data packet to the issuer 126 at 414. Once the issuer 126 approves or authenticates the transaction, the issuer 26 may return an authentication to the server 102 at 416. The server 102 may next send a response to the payment facilitator 124 at 418 so that the payment facilitator 124 may send the response to the merchant 112 that the payment from the consumer 108 is approved and that the transaction has completed.

In another embodiment, the WPS 122, in handling the processing of the payment for the payment facilitator 124 and the server 102, may expose the following application programming interfaces (APIs) or receive calls of one of the following application programming interfaces (APIs) from the payment facilitator 124 or the CWS 120:

(1) Set Payment Info. Accepts payment info, and when called by the CWS 120, also accept one or more client ids. Return a barcode and an intent id, and if client ids are passed in, returns tokens encrypted with each client's shared secret. This API may be available to CWS 120 via x-api-key. In another embodiment, the DCP 208 in FIG. 2 may store any configuration for API calls that the other wallet providers use. In another aspect, an actual call flow may be via a separate portal in a path similar to that of the calls made by the payment facilitator 124 to the WPS 122.

(2) Retrieve Payment Info. Return a payment instrument, encrypted with the shared secret of the caller. WPS 122 should identify the caller by the client id that DCP 208 may pass in the header, look up the profile of that client in DCP 208, get the shared encryption key from merchant card services (MCS), encrypt the payload, and send it out.

(3) Update Payment Info. Called by the same entity that called Retrieve Payment into to return the results of the transaction (success or failure) along with other useful information that may be used for both internal reporting, as well as things that may be sent back to the wallet.

(4) Get New Barcode. Called by a wallet with an intent id.

Figure 5:
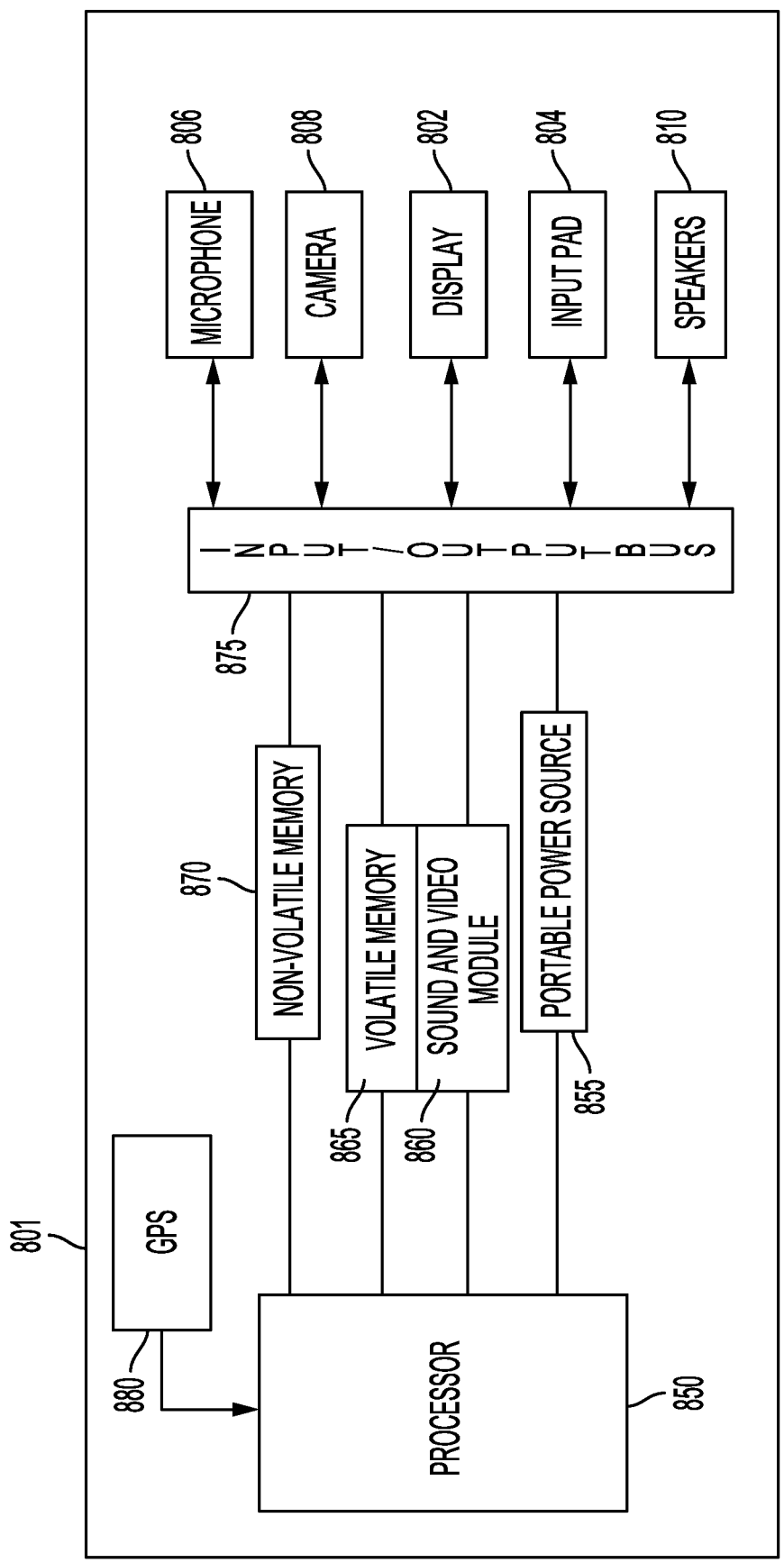
FIG. 5 is a diagram illustrating a portable computing device according to one embodiment.

FIG. 5 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc. FIG. 5 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 6:
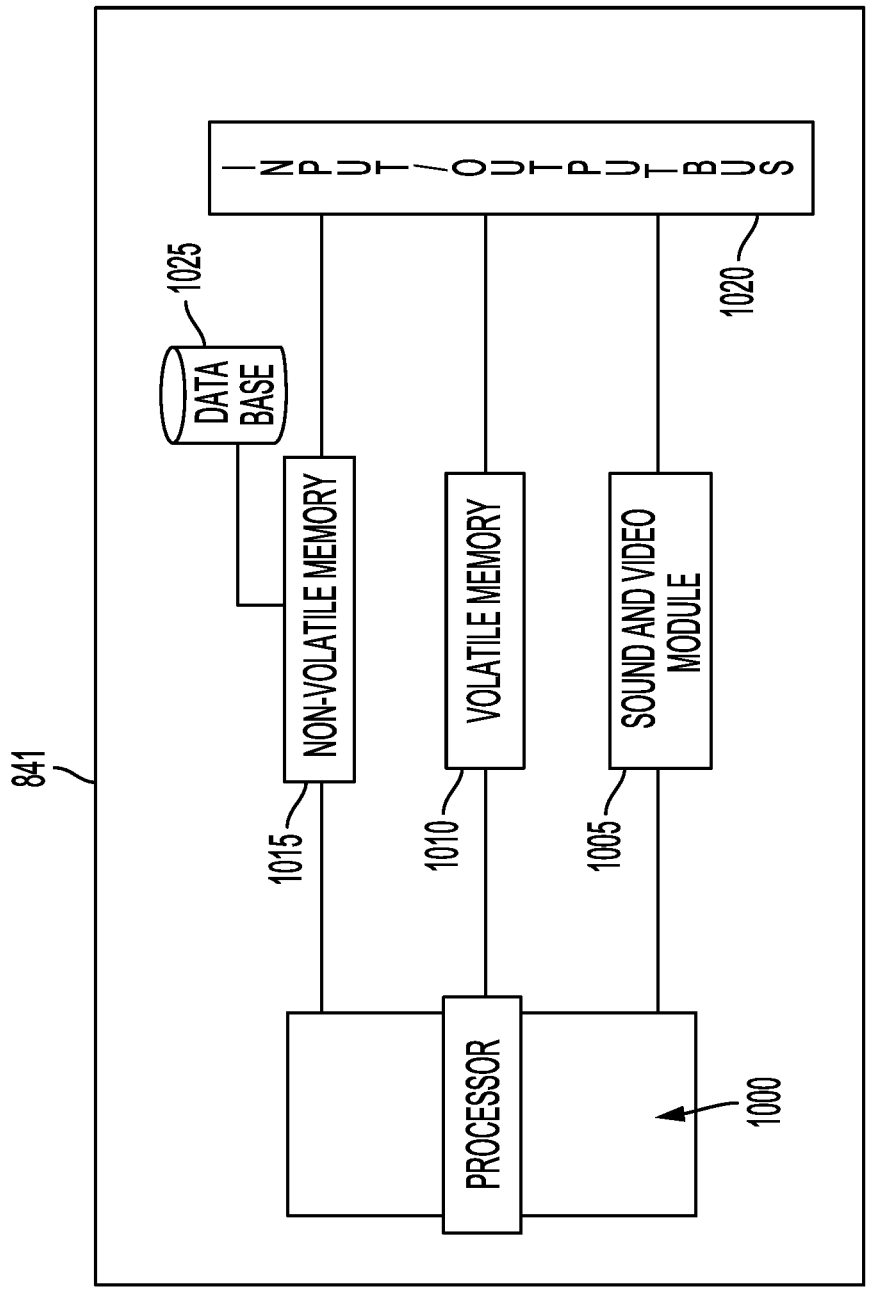
FIG. 6 is a diagram illustrating a remote computing device according to one embodiment.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel® Corporation, AMD®, ARM®, Qualcomm®, or MediaTek®); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, JAVA, C++, or PERL using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods described herein may be configured for transforming QR based payment flow to encrypted PAN payment flow. Aspects of the invention further become essential especially encrypted PAN payment flow could not be processed or completed within a restricted computer network firewall and that the permitted QR payment flow is closed payment flow within the restricted computer network firewall. Further advantages and modifications of the above described system and method may readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

APPENDIX

The following information provide additional details on APIs:

A TOKEN is a JWE or JWS formatted using compact serialization. In this case, we may be giving the payment facilitators a TOKEN formatted JWE. Following the standard, it may have five parts: A JOSE Header, a JWE Encrypted Key, an Initialization Vector, the Ciphertext, and the Authentication Tag. Each part is base64 encoded and separated by a "."

In each JWE, a new random 256 bit key may be used to encrypt the message. This key is known as the Content Encryption Key (CEK). The CEK itself may itself be encrypted, using a shared secret known to both the sender and receiver.

The first part of the JWE, the JOSE Header, may indicate the algorithm used by the CEK to encrypt the message using the "enc" parameter. The algorithm used to encrypt the CEK may be stored under the "alg" parameter. The name of the shared key used to encrypt the CEK may be stored under the "kid" parameter.

"alg":"AGCM256KW" //Encryption algorithm to be used for encryption of CEK. This value is constant and can be hard-coded.

"iv":"<Size of IV is to be 96 bit.>" //IV to be used for encryption of CEK, the value is plain JSON itself is Base64-UrlSafe encoded "tag":"<128 bit value>" // Authentication tag generated from applying AES-256-GCMKW to the CEK, the value is plain JSON itself is Base64-UrlSafe encoded
"kid":"50 char API Key" //API key
"enc":"AGCM256"// Encryption algorithm to be used for encryption of text to encrypt. This value is constant and can be hard-coded.
"channelSecurityContext":"SHARED_SECRET" //Custom header field to specify type of encryption scheme. Device Level Encryption —encryption scheme which can only be originated/targeted to a device.Example-RSA_PKI, OPACITY_A, OPACITY_B.

Server Level Encryption —encryption scheme originated/targeted to the MAP/partner server. Example-SHARED_SECRET
"iat":"1429796739" //created timestamp in seconds which indicate that a JWE can only be valid till a x time interval after its created.
Here is an example of a JOSE header that may exist in a JWE generated by the encryption framework:
:{"alg":"A256GCMKW","iv":"xPa1wjwNBOR2IbHY", "tag":"95Pc_zVoR7r7Ti4aW7N2Cg", "enc":"A256GCM",
"typ":"JOSE","kid":"kid13245","channelSecurityContext": "SHARED_SECRET", "iat":"1431594282"} ration month, the expiration year, and the card type (VISA). It is invalid to pass only a cryptogram but no cryptogram type. It is invalid to pass a cryptogram type but no cryptogram. If a cryptogram type and cryptogram are both present, then the payment instrument is considered a token, otherwise it is considered a PAN.

Regarding encryption: while CWS 120 can send PAN/Token information to WPS 122 just over TLS because it is inside Visa, when the PAN information is sent via DCP 208, TLS is not enough. Message Level Encryption should be used for this. That means that the DCP 208 project should be MLE enabled.

Once the API receives the above items, it may create an intent id and a timestamp. It may create a JSON payload of the above items (except for the timestamp), and then store to the database the intent id, the JSON payload, the timestamp, and a status of CREATED. Here is an example of the JSON payload:

```
{"intentId": "1234578",
   "paymentInstrument" :
     {
"accountType":"CREDIT_CARD", "accountNumber":"4444333322221234",
"expirationMonth":"02", "expirationYear":"2012", "cardType":"VISA", cardId: "aaa-bbb-ccc-ddd"
     }
}
```

If a token:
A JWE. The message may be as follows:

```
{"intentId": "1234578",
   "paymentInstrument" :
     {
"accountType":"CREDIT_CARD", "account_number":"4444333322221234",
"expirationMonth":"02", "expirationYear":"2012", "cardType":"VISA", cardId: "aaa-bbb-ccc-ddd", "cryptogram" : "342", "cryptogramType": "DTVV"
     }
}
```

The second part of the TOKEN may be the base64 encoded version of the encrypted version CEK
The third part of the TOKEN may be the IV used by the CEK.

The fourth part of the JTW may be the encrypted message. The fifth part is the authentication tag, which is another output of the encryption done by the CEK on the message.

The encryption framework can do all of this for us at Visa, and we should use it. We are recommending to our partners that they user a library to decrypt the TOKEN, and have pointed them to a web page at token.io.
The encrypted message itself may contain the Pan and expiration. See the API sections for the actual payload.
Set Intent
This API may be passed a payment instrument. If being called by CWS 120, it may accept one or more client IDs as well. The full details of what may be passed: The payment instrument (Pan or token), cryptogram if a token, cryptogram type if a token, the timestamp, the client id that created the intent (if coming from DCP 208, otherwise blank), the card id of the payment instrument or token in the wallet, the account type (CREDIT_CARD, DEBIT_CARD), the expi- Each intent on the server may have up to two barcodes pointing to it: the currently active barcode (corresponding to the barcode shown in the device) and the barcode that was generated just prior to that. Therefore, each barcode may be live for two minutes. In the first minute of a barcode's life, it may potentially be displayed on the user's screen. In the second minute, it may not be on the screen, but it is still valid for the payment facilitators to pass us the barcode and get a payment. The ttl that is returned with the barcode is one minute from the creation time. The ttl thus refers to the time the barcode should be displayed, not the time that the barcode is no longer valid. The barcode may be generated by the use of Java Secure Random to generate random digits. The first digit may be a "4". The next three digits may be provided by product for MVP (or random). The next 14 digits may be random. The last digit may be a checksum. Algorithm for generating a barcode: Generate a 19 digit barcode using the above strategy. Check to see if the barcode exists. If so, generate a different one. If not, go ahead and use it. We may store bar codes for 24 hours (even though they may only be valid for the first two minutes of their existence) to lower the chance of collision with an older bar code.

Once the barcode has been generated, if client IDs were passed in, the set intent method should now go to DCP to get the profile and MCS to get the shared secret associated with the client ids that were passed in. The shared secrets should be used to encrypt the JSON payload generated above. For each client id, one shared secret should be used to encrypt the payload, meaning that there may be one encrypted payload for each client id passed in. Encryption should use the encryption frameworks library for this, which makes the encryption a single call:
String jwe=
TOKENUtility.createSharedSecretJwe("text", "kid13245", "encryptionsecret");
For Text, we put the text to be encrypted. The kid corresponds to the apikey, and the encryption secret is the shared secret.

Once the barcode, intent id, and TOKENs (if any) have been created, the setIntent method returns to the caller with these specific items.

Retreive Payment Data

The Payment facilitators may call retrieve payment data, passing in a bar code or cQR. Just because a barcode is associated with an intent, the barcode may not be valid—each barcode has an expiration timestamp, and that should be checked at the time the barcode is being used to retrieve a TOKEN.

WPS 122 may look at the request, and based on the client id passed in, retrieve the profile from DCP and encryption key and shared secret from MCS, and then encrypt the payload using the encryption framework's method to encrypt TOKENs. WPS 122 may change the status of the intent to RETRIEVED, and put the payment facilitator's id in the intent, and put the current timestamp in the retrieved timestamp field.

WPS 122 may then return the TOKEN to the caller.

Update Payment Data

The payment facilitators may call update payment data, passing in the details of a transaction. WPS 122 may change the status of the intent to SUCCESSFUL_TRANSACTION or UNSUCCESSFUL_TRANSACTION, based on what is sent in the response. The full details of what is passed in can be found in the API definition later in the document.

In case of a refund, the payment facilitators may call update payment data again, passing in details of the transaction. WPS 122 may change the status of the intent to PARTIAL_REFUND or FULL_REFUND, based on what is sent in the response.

For both the initial update payment call and the refund call, WPS 122 may call CWS 120 with details, including merchant name, amount, currency type, timestamp, and intentId. CWS 120 may use the intentId to look up the deviceId that created the intent, so that it knows which device to notify.

Get Barcode

A wallet can call get Barcode, passing in an intent id, and get another barcode. This may cause the current barcode to be moved to the "old" barcode slot, the old barcode to no longer be associated with the intent, and a new barcode created and put in the current barcode slot. Even if a barcode is no longer associated with an intent, we keep it around for 24 hours so that we have no collisions within that time period.

If a barcode is valid, but points to an intent that is marked as something other than CREATED, WPS 122 should create a new intent that is a copy of the intent that the barcode was pointing to (but with a different intent id), and then return that payload. Make sure, when copying the old intent record to the new intent record, that you go into the payload itself and update the intent to the new intent id.

Tokenization

At enrollment time, CWS 120 may pass the PAN to DCA's profile service for storage purposes. DCA may return the card id. CWS 120 may call VTS to get an ecomm token for the card, and then store the card id, token, user guid mapping.

At payment time—in other words, when CWS 120 is preparing to call WPS 122 to store payment info and return a barcode, CWS 120 may check and see if the default card associated with the user has a ecom token. If there is an ecom token, then CWS 120 may call VTS to get a cryptogram for the token and the cryptogram type. CWS 120 may then pass the token, cryptogram, and cryptogram type to WPS 122 instead of the PAN. For future flexibility, we reserve the right to pass any type of cryptogram and cryptogram type in the payload, and may provide a mapping to the payment facilitators so that they know which place in the ISO they should put which token/cryptogram.

Refunds

We may be returning the refund Id in the payment history sent from CWS 120 to the phone. When a user wants a refund, he or she may bring up the transaction in the transaction history, and the app may show the refund id both as a string of numbers, and as a barcode.

The merchant may find the transaction in the merchant's system, and then process a full or partial refund.

The merchant's system may call the payment facilitator, who may call the payment processor to process the refund. The payment facilitator may then call both the merchant and WPS 122 to update the original transaction with the refund information.

APIs Exposed by WPS 122

Note that every time a payment facilitator call APIs, the payment facilitator may pass an APIkey as a query parameter, so that ARM knows which shared secret was used to generate the x-pay-token in use. This parameter is not specified in the API definitions below, but must be present POST to /Intent

| What | POST to an intent |
|---|---|
| Purpose | Called by wallets to store payment data and get back a bar code. |
| Input | All the parameters such as payment instrument needed to create a new intent |
| Returns | Intent ID |
| Interface | Rest API |
| URI | /v1/WPS 122 POST to /intent |
| Http Verb | POST |
| Request Standard Headers | Name / type / mandatory / notes —— Content-Type / MIME / yes / Must be "application/json" |
| Request Custom Headers | x-pay-token if coming from third party wallets via DCP 208. x-api-key if coming from our own WPS 122 |

| Request Body | Level | Attribute | Type | Required/Conditional/Optional | Size | Description |
|---|---|---|---|---|---|---|
| | root | paymentInstrument | String | Required | 16 | Pan or token |
| | root | cryptogramType | String | Optional | 30 | |
| | root | cryptogram | String | Optional | 100 | |
| | root | cardId | String | Optional | 100 | CardId in the wallet setting the intent |
| | root | accountType | String | Required | 30 | |
| | root | expMonth | String | Required | 2 | |

| | root | expYear | String | Required | 4 | |
|---|---|---|---|---|---|---|
| | root | cardType | String | Required | 30 | |
| | root | clientIds | Array of Strings | Optional, only valid from CWS 120 | Each string can be 100 chars in length. | |
| Response Standard Headers | name | type | mandatory | notes | | |
| | Content-Type | MIME | yes | Must be "application/json" | | |
| Response Custom Headers | none | | | | | |
| Response Body | Level | Attribute | Type | Required/Conditional/Optional | Description | |
| | SUCCESS | | | | | |
| | root | intentId | String | Required | | |
| | Root | barcode | String | Required | | |
| | Root | barcodeTtl | String | Required | ISO formatted UTC timestamp: YYYY-MM-DDTHH:MM:SSZ | |
| | Root | Array of tokenPackage | JSON Array | Required | | |
| | tokenPackage | clientId | String | Required | Client Id corresponding to the key | |

|  |  |  |  |  |  |
|---|---|---|---|---|---|
|  | tokenPackage | token | String | Required | Contains the actual token |
|  | tokenPackage | urlPattern | String | Required | url pattern that indicates a particular payment facilitator has provided the url. Used in MQR. |
|  | ERROR | | | | |
|  | root | errorMessage | String | Conditional | Error message content if unable to retrieve payment info |

| Behavior | HTTP Status Code | Reason Code | Error Message | Description |
|---|---|---|---|---|
|  | SUCCESS | | | |
|  | 200 (OK) | | | |
|  | ERROR | | | |
|  | 400 (Bad Request) | validation-error | Array of: Invalid entry for <fieldname>, reason | Too long, wrong data type (should be numbers only) |
|  | 400 (Bad Request) | validation-error | Array of: Missing entry for <fieldname> | |
|  | 400 (Bad Request) | validation-error | Invalid Entry | Invalid entry |

| Sample Http Request | POST /v1/WPS 122/intent<br>Host: api.visa.com<br>Content-Type: application/json<br>{<br> "paymentInstrument" : "4xxxx",<br> "cryptogramType": "TAVV",<br> "cryptogram": "faewrro4434324qre",<br> "cardId":"123-abcd-afw"<br> "accountType":"CREDIT_CARD"<br> "expMonth" : "12" |
|---|---|

| | "expYear": "2020"<br>"cardType", "VISA"<br>"clientIds", ["23423","14534"]<br>} |
|---|---|
| Sample Http Response | {<br>"intentId": "2343243",<br>"barcode" : "23442523452323532",<br>"barcodeTtl" "2019-04-01T12:12:12Z"<br>"tokenPackages" : [{"clientId":"wr34r", "token":"345.25t4.aaf.24qq2.af",<br>"url" : "example.com"}]<br>} |

GET to /paymentCodes/{barcode}

| What | GET to /paymentCodes/{barcode} |
|---|---|
| Purpose | Called by banks to get the full payment data |
| Input | A payment code (e.g., bar code) |
| Returns | An encrypted payment information |
| Interface | Rest API |
| URI | /v1/WPS 122/GetPaymentCodes/{barcodes} |
| Http Verb | POST |

| Request Standard Headers | Name | type | mandatory | notes | | |
|---|---|---|---|---|---|---|
| | Content-Type | MIME | yes | Must be "application/json" | | |

| Request Custom Headers | x-pay-token | | | | | |
|---|---|---|---|---|---|---|

| Request Body | Level | Attribute | Type | Required/Conditional/Optional | Size | Description |
|---|---|---|---|---|---|---|
| | root | paymentReference | String | Required | Up to 100 | The numbers from a |

| | | | | | cQR or cBC |
|---|---|---|---|---|---|
| Response Standard Headers | name | type | mandatory | notes | |
| | Content-Type | MIME | yes | Must be "application/json" | |
| Response Custom Headers | none | | | | |
| Response Body | Level | Attribute | Type | Required/Conditional/Optional | Description |
| | SUCCESS | | | | |
| | root | encPaymentData | String | Required | A JWE. The message may be as follows:<br><br>{"intentId": "1234578", "paymentInstrument" :<br>{<br>"accountType":"CREDIT_CARD",<br>"accountNumber":"4444333322221234",<br>"expirationMonth":"02",<br>"expirationYear":"2012",<br>"cardType":"VISA", cardId: "aaa-bbb-ccc-ddd"<br>}<br>} |
| | ERROR | | | | |
| | root | errorMessage | String | Conditional | Error message content if unable to retrieve payment info |

| Behavior | HTTP Status Code | Reason Code | Error Message | Description |
|---|---|---|---|---|
| | SUCCESS | | | |
| | 200 (OK) | | | |
| | ERROR | | | |
| | 400 (Bad Request) | validation-error | Array of: Invalid entry for <fieldname>, reason | Too long, wrong data type (should be numbers only) |
| | 400 (Bad Request) | validation-error | Array of: Missing entry for <fieldname> | In this case, there is only one field that could be missing. |
| | 400 (Bad Request) | validation-error | Invalid Entry | Invalid bar code |
| Sample Http Request | POST /v1/WPS 122/GetPaymentCodes/{barcode}<br>Host: api.visa.com<br>Content-Type: application/json<br>{<br>"transactionId" : "12345678901234"<br>} |
| Sample Http Response | {<br>"encPaymentData" : "22345as.fajlajv4o.8ojaff4jj.98afj.89a8fj"<br>} |

Update Payment Info

| What | Update Payment Info |
|---|---|
| Purpose | Called by Payment Facilitators after a transaction has been processed, to let the wallet app know the status of the payment. |
| Input | Status of a processed payment |
| Response | Success |
| Interface | Rest API |

| URI | /v1/WPS 122/payments/{intentId} |
|---|---|
| Http Verb | PUT |
| Request Standard Headers | Name \| type \| mandatory \| notes <br> Content-Type \| MIME \| yes \| Must be "application/json" |
| Request Custom Headers | x-pay-token |

| Request Body | Level | Attribute | Type | Required/Conditional/Optional | Size | Description |
|---|---|---|---|---|---|---|
| | root | updateInfo | array | Required | n/a | An array of payInfo and orderInfo objects |
| | Root | cardId | String | Required | 50 | CardId passed to PF |
| | Root | merchant | String | Required | 100 | |
| | Root | refundIid | String | Required | 50 | |
| | updateInfo | payInfo | JSON Obect | Required | n/a | |
| | updateInfo | orderInfo | JSON Object | Required | n/a | |
| | payInfo | total | String | Required | 15 | Numeric; maximum 9 digits before an optional decimal point and 4 decimal digits |

| | | | | | Example: "total":"9.00" |
|---|---|---|---|---|---|
| payInfo | currencyCode | String | Required | 3 | Presumably always CNY |
| payInfo | avsResponseCode | String | Optional (probably not used for China Inbound App) | 1 | Address verification system response code |
| payInfo | eventStatus | String | Required | | Format: It is one of the following values:<br>• Success<br>• Failure<br>• Fraud<br>• Chargeback<br>• Other<br>Specify Success or Failure if the eventType is Authorize, Capture, Refund, or Cancel; otherwise, specify the same value as the eventType, e.g. specify Other if the eventType is Other.<br>Example: "eventStatus":"Success" |
| payInfo | reason | String | Optional | 255 | Reason for the update. Alphanumeric |

| | | | | | |
|---|---|---|---|---|---|
| payInfo | eventType | String | Required | | Kind of event associated with the update.<br>Format: It is one of the following values:<br>• Authorize<br>• Capture<br>• Refund<br>• Cancel<br>• Fraud<br>• Chargeback<br>• Other<br>Example: "eventType":"Authorize" |
| orderInfo | payTransId | String | | 100 | Payment transaction ID associated with the merchant authorization of the payment instrument. Use the identifier for a transaction within the card network. The processor receives this number from the network and passes it on to the merchant in the authorization, capture, refund, etc.<br>Format: Alphanumeric; maximum 100 characters |
| orderInfo | total | String | Required | | Total of the payment including all amounts.<br>Format: Numeric; maximum 9 digits before an optional |

| | | | | | |
|---|---|---|---|---|---|
| | | | | | decimal point and 4 decimal digits<br>Example:<br>"total":"9.00" |
| orderInfo | currentyCode | String | Required | | Presumably always CNY |
| orderInfo | Subtotal | String | Required | | Format: Numeric; maximum 9 digits before an optional decimal point and 4 decimal digits<br>Example:<br>"subtotal":"9.00" |
| orderInfo | shippingHandling | String | Optional | | Total of shipping and handling charges for the payment.<br>Format: Numeric; maximum 9 digits before an optional decimal point and 4 decimal digits<br>Example:<br>"shippingHandling": "3.00" |
| orderInfo | tax | String | Optional | | Total tax-related charges in the payment.<br>Format: Numeric; maximum 9 digits before an optional decimal point and 4 decimal digits<br>Example:<br>"tax":"1.00" |
| orderInfo | discount | String | Optional | | Total of discounts related to the payment. If provided, it is a positive value |

| | | | | | |
|---|---|---|---|---|---|
| | | | | | representing the amount to be deducted from the total.<br>Format: Numeric; maximum 9 digits before an optional decimal point and 4 decimal digits<br>Example: "discount" : "2.50" |
| orderInfo | giftwrap | String | Optional | | Total gift-wrapping charges in the payment.<br>Format: Numeric; maximum 9 digits before an optional decimal point and 4 decimal digits<br>Example: "giftWrap" : "1.99" |
| orderInfo | Misc | String | Optional | | Total uncategorized charges in the payment.<br>Format: Numeric; maximum 9 digits before an optional decimal point and 4 decimal digits<br>Example: "misc":"1.00" |
| orderInfo | eventType | String | Required | | Kind of event associated with the update.<br>Format: It is one of the following values:<br>• Create - Card on file saved (outside of a purchase flow) |

| | | | | | • Confirm - Order placed<br>• Confirm_COF - Order placed using a card on file<br>• Cancel - Order canceled<br>• Fraud - Order rejected by risk/fraud review<br>• Other - None of the above events or payment event subsequent to a Confirm or Confirm_COF order event.<br>Example: "eventType":"Confirm" |
|---|---|---|---|---|---|
| | orderInfo | orderId | String | Required | Merchant's order ID associated with the payment.<br>Format: Alphanumeric; maximum 100 characters |
| Response Standard Headers | name | type | mandatory | notes | |
| | Content-Type | MIME | Conditional (if sending an error message) | Must be "application/json" | |
| Response Custom Headers | none | | | | |
| Response Body | Level | Attribute | Type | Required/Conditional | Description |

| | | | | /Optional | |
|---|---|---|---|---|---|
| SUCCESS | | | | | |
| Empty Body | | | | | |
| ERROR | | | | | |
| root | errorMessage | String | Conditional | Error message content if unable to retrieve payment info | |

| Behavior | HTTP Status Code | Reason Code | Error Message | Description |
|---|---|---|---|---|
| | SUCCESS | | | |
| | 204 (No Content) | | | |
| | ERROR | | | |
| | 400 (Bad Request) | validation-error | Array of: Invalid entry for <fieldname>, reason | Too long, wrong data type (should be numbers only) |
| | 400 (Bad Request) | validation-error | Array of: Missing entry for <fieldname> | In this case, there is only one field that could be missing. |
| | 400 (Bad Request) | validation-error | Invalid Entry | |
| Sample Http Request | PUT /v1/WPS 122/updatePayymentInfo<br>Host: api.visa.com<br>Content-Type: application/json<br>{"updateInfo" : [<br>    {"payInfo" : {"total" "5.91", "currencyCode" : "CNY", "eventStatus":"Success", "eventType" : "Authorize"}<br>    {"orderInfo" : {"total" : "5.91", "subtotal" : "5.91" , "payTransId" : "34afjl2j;l23fj", "currencyCode" : "CNY", "eventType": "Confirm", "orderID" "24324"}<br>    } | | | |

|  |  |
|---|---|
|  | ]<br>  "cardId" : "aaa-bbb-ccc-ddd",<br>"refundId" : "12355",<br>"merchant" : "Bob's tires"<br>} |
| Sample Http Response | A header of 204 (No Content) |

Barcode

| What | Get Barcode | | | | | |
|---|---|---|---|---|---|---|
| Purpose | Called by the wallet to get the Barcode for an intent | | | | | |
| Input | an intent ID | | | | | |
| Returns | a new barcode (since barcodes are only valid for 2 minutes, for example)) | | | | | |
| Interface | Rest API | | | | | |
| URI | /v1/WPS 122/barcode | | | | | |
| Http Verb | GET | | | | | |
| Request Standard Headers | Name | type | mandatory | notes | | |
| | Content-Type | MIME | yes | Must be "application/json" | | |
| Request Custom Headers | x-api-key, since the request may be coming from CWS 120 at first.<br>Later x-pay-token when the request comes from other wallet providers. | | | | | |
| Request Body | Level | Attribute | Type | Required/Conditional/Optional | Size | Description |
| | root | intentId | String | Required | Up to 100 | |

| Response Standard Headers | name | type | mandatory | notes | |
|---|---|---|---|---|---|
| | Content-Type | MIME | yes | Must be "application/json" | |
| Response Custom Headers | none | | | | |
| Response Body | Level | Attribute | Type | Required/Conditional/Optional | Description |
| | SUCCESS | | | | |
| | root | barcode | String | Required | The barcode associated with the intent |
| | Root | barcodeTtl | String | Required | The TTL for displaying the barcode. ISO UTC YYYY-MM-DDTHH:MM:SSZ |
| | ERROR | | | | |
| | root | errorMessage | String | Conditional | Error message content if unable to generate the barcode |
| Behavior | HTTP Status Code | Reason Code | Error Message | Description | |
| | SUCCESS | | | | |
| | 200 (OK) | | | | |
| | ERROR | | | | |
| | 400 (Bad Request) | validation-error | Invalid entry for intent reason | Too long | |
| | 400 (Bad Request) | validation-error | Missing entry for cardId | In this case, there is only one field that could be missing. | |

|  | 400 (Bad Request) | validation-error | Invalid Entry | Not a valid intent |
|---|---|---|---|---|
| Sample Http Request | GET /v1/WPS 122/barcode<br>Host: api.visa.com<br>Content-Type: application/json<br>{<br>  "intentId" : "12345678901234"<br>} | | | |
| Sample Http Response | {<br>"barcode" : "234524523",<br>"barcodeTtl": "2019-05-21T22:12:35Z"<br>} | | | |

Important APIs of CWS 120

Logging in:

Standard flow, where the app calls oauth2/token, which calls the identity service with the user/pass. If the system replies back confirming the user/pass, then ARM may generate a token that is passed back to the app.

Get Payment History

| What | Get Payment History |
|---|---|
| Purpose | Called by the app to retrieve payment history. Even though we are going to be sending payment history via in app notifications, these notifications are not guaranteed. We therefore need to retrieve from our servers a complete payment history (last 30 days or last 10 transactions, whichever is greater. i.e. if there are only 10 transactions over the past 60 days, so all 10 transactions. If there are more than 10 transactions within the past 30 days, show all the transactions in the past 30 days). |
| Interface | Rest API |
| URI | /v1/CWS 120/paymentHistory and /v1/CWS 120/paymentHistory?page=xxxx. See "_links" section for details |
| Http Verb | GET |

| | | | | | |
|---|---|---|---|---|---|
| Request Standard Headers | None | | | | |
| Request Custom Headers | The app may pass the auth token, and ARM may populate the user info in the header | | | | |
| Request Body | None | | | | |
| Response Standard Headers | name | type | mandatory | notes | |
| | Content-Type | MIME | yes | Must be "application/json" | |
| Response Custom Headers | none | | | | |
| Response Body | Level | Attribute | Type | Required/Conditional/Optional | Description |
| | SUCCESS | | | | |
| | root | content | Array | Required | An array of Transaction History objects. See the Transaction History object for details |
| | transactionHistory | merchantName | String | Required | |
| | transactionHistory | transactionTime | String | Required | |
| | transactionHistory | amount | String | Required | |

| | | | | | |
|---|---|---|---|---|---|
| | transactionHistory | transactionCurrencyCode | String | Required | |
| | transactionHistory | Status | String | Required | |
| | transactionHistory | refundId | String | Required | Embodiments of the invention may show the numbers and a barcode of this when a user wants to get a refund. |
| | root | _links | JSON Object | Required | |
| | _links | self | JSON Object | Required | Points to the url that retrieved the current page |
| | _links | first | JSON Object | Required | Point to the url of the first page of results |
| | _links | next | JSON Object | Conditional | Points to the url of the next page of results, if there is a next page |
| | _links | previous | JSON Object | Conditional | Points to the url of the previous page of result. May therefore not be present on the first page. |
| | ERROR | | | | |
| | root | errorMessage | String | Conditional | Error message content if unable to retrieve payment info |
| Behavior | HTTP Status Code | Reason Code | Error Message | | Description |
| | SUCCESS | | | | |

|  |  | 200 (OK) |  |  |  |
|---|---|---|---|---|---|
|  |  | ERROR | | | |
|  |  | 400 (Bad Request) | validation-error | Array of: Invalid entry for <fieldname>, reason | Too long, wrong data type (should be numbers only) |
|  |  | 400 (Bad Request) | validation-error | Array of: Missing entry for <fieldname> | In this case, there is only one field that could be missing. |
|  |  | 400 (Bad Request) | validation-error | Invalid Entry | Invalid bar code |
| Sample Http Request | GET /v1/vcvs/paymentHistory<br>Host: api.visa.com | | | | |
| Sample Http Response | {<br>"content" : ["paymentHistoryObject#1", "paymentHistoryObject#2"],<br>"_links": {<br>  "self" : {"href" : https://...." },<br>  "next" : {"href" : " https://..."},<br>  "previous" : {"href" : " https://...."}<br>}<br>} | | | | |

Update Payment History

| What | Update Payment History |
|---|---|
| Purpose | Called by WPS 122 on CWS 120 to update payment history |
| Interface | Rest API |
| URI | /v1/CWS 120/paymentHistory |
| Http Verb | POST (or PUT, in the case of a refund) |
| Request Standard | None |

| | | | | | |
|---|---|---|---|---|---|
| d Headers | | | | | |
| Request Custom Headers | x-api-key | | | | |
| Request Body | Level | Attribute | Type | Required/Conditional/Optional | Description |
| | SUCCESS | | | | |
| | Root | intentId | String | Required | |
| | root | merchantName | String | Required | |
| | root | transactionTime | String | Required | |
| | root | amount | String | Required | |
| | root | transactionCurrencyCode | String | Required | |
| | root | Status | String | Required | |
| | root | refundId | String | Required | Embodiments of the invention may show the numbers and a barcode of this when a user wants to get a refund. |
| | Root | cardId | String | Required | |
| | ERROR | | | | |

|  | root | errorMessage | String | Conditional | Error message content if unable to retrieve payment info |
|---|---|---|---|---|---|

| Response Standard Headers | name | type | mandatory | notes | |
|---|---|---|---|---|---|
| | Content-Type | MIME | yes | Must be "application/json" | |

| Response Custom Headers | none |
|---|---|

| Response Body | |
|---|---|

| Behavior | HTTP Status Code | Reason Code | Error Message | Description |
|---|---|---|---|---|
| | SUCCESS | | | |
| | 200 (OK) | | | |
| | ERROR | | | |
| | 400 (Bad Request) | validation-error | Array of: Invalid entry for <fieldname>, reason | Too long, wrong data type (should be numbers only) |
| | 400 (Bad Request) | validation-error | Array of: Missing entry for <fieldname> | In this case, there is only one field that could be missing. |
| | 400 (Bad Request) | validation-error | Invalid Entry | Invalid bar code |

| Sample Http Request | POST /v1/vcvs/paymentHistory/<br>Or<br>PUT /v1/vcvw/paymentHistory/{intentId}<br>Host: api.visa.com |
|---|---|

| | |
|---|---|
| | {<br>"merchantName" : "Bob's shoes"<br>"transactionTime" : "233rw"<br>"amount" : "23424"<br>"transactionCurrencyCode":"CNY"<br>"status" : "REFUND_PARTIAL"<br>"refundId": "af2f23"<br>"intentId" : "234324",<br>"cardId" : "23klj4324"<br>} |
| Sample Http Response | N/A |

In another embodiment, an API for refund may include the following:

POST to/payments/refunds

Purpose: Called by payment facilitators when they do a partial or full refund of a transaction so that the wallet app is aware of it.

Input: Transaction ID

Returns: Success.

APIs the inbound service calls on a digital commerce app (DCA).

ARM may call DCA directly for standard lifecycle/profile management.

ARM may call out wallet profile service to get the encrypted card information and the bar code.

In App Notification

Aspects of the invention may need to send in app notifications when something has been purchased. Since the app uses DCA for the profile service, other processes may perform any enrollment beyond what is described above.

Handling Lockouts

Based on threat metrix or DFM, one embodiment of the invention may lock out the account. If the account is locked, aspects of the invention may need to tell the consumer 108 of the issue, and that the consumer 108 should try again later.

Threat Metrix

We may be making use of Threat Metrix just like a typical DCA application, to determine the risk of various actions.

Touch Id

Embodiments of the invention may request a long lived token from arm at login time, and store that in the secure element. On subsequent face/touch login, embodiments of the invention may pass the long lived token to ARM, and get back a session token.

DCP

DCP may create profiles for each payment facilitator. A profile may allow the facilitator to indicate which particular shared secret should be in use at any given time, along with specific url patterns that would indicate that they should be they payment facilitator in the case of MQR.

Data Model

Aspects of the invention may have two schemas: One for CWS 120 and one for WPS 122. For CWS 120, embodiments of the invention may need to keep track of the following:

Whether or not a user has signed the inbound app T&Cs. Embodiments of the invention may store this information in a user table.

A user's device id (if on iOS) that may be used for in app notifications. This may potentially be updated on every login.

Payment History.

| User Table | | |
|---|---|---|
| UserGuid | String | Matches the one in DCA and identity services |
| TCSigned | GUID | |
| TCTimestamp | Timestamp | |

| Intent Table | | |
|---|---|---|
| IntentId | Guid | |
| WalletDeviceId | String, 200 | |
| UserGuid | Guid | Foreign Key from User table |

| Payment History | | |
|---|---|---|
| PaymentHistoryGuid | GUID | |
| IntentId | Guid | From WPS 122. Used to update the payment history (such as for refunds) |
| MerchantName | String, size 100 | |
| PurchaseDateTime | Timestamp | |
| Amount | Integer | |
| Currency Code | 3 alphanumeric | Example: CNY |
| CardID | String, size 100 | |
| RefundId | String 100 | |
| Wallet deviceId | String 200 | |
| UserGuid | String Guid | Foreign Key from User Table |

For WPS 122, aspects of the invention may need to keep track of the following: An intent, including the intent id, the created timestamp, the status, the retrieved timestamp, the completed timestamp, the most recent refund timestamp, the id of the creator of the intent, the id of the retriever of the intent, the id of the entity that completes the intent, the id of the most recent refund of the intent, the merchant name, the user id in the wallet that the intent is being created for A Barcode Table A table indicating which barcode is the current barcode for a given intent, and which barcode is the previous barcode for a given intent.

| | | |
|---|---|---|
| Intent id | Guid | |
| Status | String Enum of CREATED, RETRIEVED, SUCCESSFUL_TRANSACTION, FAILED_TRANSACTION, PARTIAL_REFUND, FULL_REFUND | |
| Payload | String (4000) | Encrypted, after created |
| Merchant Name | String | After update |
| Update Info | String (4000) | After update |
| PaymentInfo | String (4000) | After update |
| OrderInfo | String (4000) | After update// might want to pull visanet txn id out of here and store it in a separate column for auditing purposes. |
| Wallet user Guid | String 200 | |
| Wallet device Id | String 200 | |
| RefundId | String 100 | |

| Detail table. Can easily be purged. Need a data retention policy. | |
| --- | --- |
| State | Enum |
| Ts | Timestamp |
| Client id | String/Guid |
| Intent id | String/Guid |
| Barcode | 19 digits |
| CreatedAt | Timestamp |

| IntentBarcode | |
| --- | --- |
| Barcode | |
| IntentId | |
| Status | ENUM of CURRENT, PREVIOUS |

What is claimed is:

1. A computer-implemented system for streamlining encryption payload of a card transaction from a merchant inside a restricted computer network firewall comprising:
a payment processing server for processing payment transactions;
a wallet application for storing data of a payment device of a user for conducting a payment transaction;
a payment facilitator coupled between the payment processing server and the wallet application;
wherein the wallet application retrieves information of a merchant and a transaction via scanning a transaction code for initiating the payment transaction to the merchant;
in response to the retrieved information, wherein the wallet application generates an encrypted payload including at least the following data: data of the payment device, information of the merchant, and information of the payment transaction;
wherein the wallet application transmits the encrypted payload to the payment facilitator within the restricted computer network firewall;
wherein the payment facilitator decrypts the encrypted payload to form a decrypted payload;
after decryption of the encrypted payload, wherein the payment facilitator transmits the decrypted payload in one payment packet to the payment processing server outside the restricted computer network firewall; and
wherein the payment processing server transmits from outside the restricted computer network firewall to the merchant inside the restricted computer network firewall a notification of payment after the payment processing server validates the payment transaction.

2. The computer-implemented system of claim 1, wherein the transaction code comprises a quick response (QR) code.

3. The computer-implemented system of claim 1, wherein the wallet application transmits the encrypted payload via a URL formatted address.

4. The computer-implemented system of claim 1, wherein the wallet application is configured to be installed on a mobile device of the user.

5. The computer-implemented system of claim 3, wherein the restricted computer network firewall limits outbound transactions except for permitted URL sites and wherein the URL formatted address is one of the permitted URL sites.

6. A computer implemented system for streamlining encryption payload of a card transaction from a merchant inside a restricted computer network firewall comprising:
a payment processing server for processing payment transactions;
a wallet application for storing data of a payment device of a user for conducting a payment transaction;
a payment facilitator coupled between the payment processing server and the wallet application;
wherein the wallet application receives information of a merchant and a transaction after presenting a transaction code to be scanned by the merchant for initiating the payment transaction to the merchant;
in response to the received information, wherein the wallet application generates an encrypted payload including at least the following data:
data of the payment device, information of the merchant, and information of the payment transaction;
wherein the wallet application transmits the encrypted payload to a payment facilitator within the restricted computer network firewall;
wherein the payment facilitator decrypts the encrypted payload to form a decrypted payload;
after decryption of the encrypted payload, wherein the payment facilitator transmits the decrypted payload in one payment packet to the payment processing server outside the restricted computer network firewall; and
wherein the payment processing server transmits from outside the restricted computer network firewall to the merchant inside the restricted computer network firewall a notification of payment after the payment processing server validates the payment transaction.

7. The computer-implemented system of claim 6, wherein the transaction code comprises a quick response (QR) code.

8. The computer-implemented system of claim 6, wherein the wallet application transmits the encrypted payload via a URL formatted address.

9. The computer-implemented system of claim 6, wherein the wallet application is configured to be installed on a mobile device of the user.

10. The computer-implemented system of claim 8, wherein the restricted computer network firewall limits outbound transactions except for permitted URL sites and wherein the URL formatted address is one of the permitted URL sites.

11. A computer-implemented method for limiting a number of encrypted transaction data packet transmission between a merchant and a server comprising:
storing, by a wallet application, data of a payment device of a user for conducting a payment transaction;
obtaining, by the wallet application, information of a merchant and a transaction via obtaining a transaction code for initiating the payment transaction to the merchant;
in response to the obtained information, generating, by the wallet application, an encrypted payload including at least the following data:
data of the payment device, information of the merchant, and information of the payment transaction;
transmitting the encrypted payload to a payment facilitator within a restricted computer network firewall;
decrypting, by the payment facilitator, the encrypted payload to form a decrypted payload;
after decryption of the encrypted payload, transmitting the decrypted payload in one payment packet to a payment processing server outside the restricted computer network firewall; and
transmitting from outside the restricted computer network firewall to the merchant inside the restricted computer network firewall a notification of payment after the payment processing server validates the payment transaction.

12. The computer-implemented method of claim 11, wherein the wallet application obtains information of the merchant and the transaction via scanning the transaction code via a camera for initiating the payment transaction to the merchant.

13. The computer-implemented method of claim 11, wherein the wallet application obtains information of the merchant and the transaction after presenting the transaction code on a display to be scanned by the merchant for initiating the payment transaction to the merchant.

14. The computer-implemented method of claim 11, wherein the transaction code comprises a quick response (QR) code.

15. The computer-implemented method of claim 11, wherein the wallet application transmits the encrypted payload via a URL formatted address.

16. The computer-implemented method of claim 11, wherein the wallet application is configured to be installed on a mobile device of the user.

17. The computer-implemented method of claim 15, wherein the restricted computer network firewall limits outbound transactions except for permitted URL sites and wherein the URL formatted address is one of the permitted URL sites.

* * * * *